United States Patent [19]

Schorr

[11] Patent Number: 4,490,692
[45] Date of Patent: Dec. 25, 1984

[54] REVERSE EQUALIZATION NETWORK

[75] Inventor: Ian A. Schorr, Chicago, Ill.

[73] Assignee: Rockwell International, El Segundo, Del.

[21] Appl. No.: 382,067

[22] Filed: May 26, 1982

[51] Int. Cl.³ .............................................. H03H 11/06
[52] U.S. Cl. ............................... 333/28 R; 179/170.8; 381/103
[58] Field of Search ............. 333/28 R, 28 T; 375/11; 179/170 C, 170 D, 170.8; 381/103, 104

[56] References Cited

U.S. PATENT DOCUMENTS

| | | | |
|---|---|---|---|
| 3,423,535 | 1/1969 | Hochgraf et al. | 333/28 R X |
| 3,728,649 | 4/1973 | Waldhauer | 333/28 R X |
| 4,011,530 | 3/1977 | Carver | 333/28 R |
| 4,028,644 | 6/1977 | Niiro | 333/28 R X |

Primary Examiner—Paul L. Gensler
Attorney, Agent, or Firm—C. B. Patti; V. Lawrence Sewell; H. Frederick Hamann

[57] ABSTRACT

An equalization network is disclosed combining negative slope equalization with low pass filtering and low frequency compensation. The network is for use on electrical lines transmitting electrical signals in the voice frequency range and includes circuitry for inputting and equalizing the electrical signal on an incoming line. A circuit for reverse equalizing the electrical signal, first and second circuits for equalizing the signal, circuits for low pass filtering the signal followed by a supplemental equalization circuit and then a circuit for outputting the signal to the outgoing electrical line a. provided.

22 Claims, 6 Drawing Figures

REVERSE EQUALIZATION NETWORK

BACKGROUND OF THE INVENTION

The present invention relates in general to an equalization network for use in a repeater stage in a telephone communications system, and in particular, to an equalizer including a reverse equalization network with frequency equalization and a pre-determined frequency cut-off beyond the end of the voice frequency range of telephone communication.

Every wire transmission line is comprised of distributed series resistance, distributed series inductance and shunt capacitance. The frequency response is attenuated for high frequencies to a greater degree than for low frequencies. The degree of such attenuation is a function of line length with the slope of the frequency response increasing with length. To compensate for this phenomenon, a number of slope equalization techniques are known in the prior art. The slope equalizer circuit attempts to compensate for the transmission line characteristics whereby the resultant frequency response is essentially flat over the frequency range of interest.

A "non-loaded" telephone line has the characteristics described above. A "loaded" line has a flatter frequency response because inductors are physically inserted in the line and so as to appropriately load the line. This results in a flatter frequency response in the higher frequency range.

Typical telephone communication systems use two-wire and four-wire lines. The frequency band for these lines is 0.3 KHz to 3.5 KHz for voice communication. Because of frequency related losses in the line, it is necessary to bring the frequency response back up to an essentially flat response in order to restore the signal to the original level and to improve the quality of the transmission. A repeater provides amplification and frequency equalization.

Because of the existence of "non-loaded" lines and "loaded" lines and combinations thereof, and two-wire and four-wire lines, there exists a need for a universal equalizer network. Of particular need is a passive negative slope section in the network, as disclosed by the invention of the applicant, which offsets the frequency characteristics of other sections thereby enabling equalization over the full frequency range of interest. The use of a negative slope section cascaded with other circuit sections to implement a universal equalizer is not found in the prior art.

U.S. Pat. No. 4,012,704 discloses an equalizer comprised of a number of operational amplifier sections wherein passive components are selectively switched into the operational amplifier circuitry to effect the conventional control over circuit Q's, bandwidths, and resonant frequencies. Additionally, the patent teaches the use of a number of variable resistors as part of the input circuitry. These variable resistors do not have a straight negative slope effect, but interact with the active operational amplifier circuitry.

U.S. Pat. No. 3,940,709 discloses an operational amplifier implemented equalization circuit for use at audio frequencies which also teaches the selective insertion by switching of passive networks to provide the desired gain slopes and frequency cut in points. While the disclosure begins to suggest the concept of a "falling in amplitude" capability, the remainder of the disclosure teaches away from this and describes only positive slope results.

The relevance of the prior art indicated in the present specification, should not be given a limited interpretation. A cited prior art item may be found to have relevance at a passage other than one referred to, or to have relevance in the sense different than as stated.

OBJECTS OF THE INVENTION

It is a general object of the present invention to provide a universal equalization network for voice frequency repeaters.

It is a more specific object of the present invention to provide a reverse equalization network for use in the universal equalization network.

It is a further object to provide an equalizer which can be adjusted to operate with "non-loaded" lines and "loaded" lines and combinations thereof.

It is another object to provide an equalizer which can be adjusted to operate with two-wire or four-wire lines.

It is another object of the present invention to provide an universal equalization network which is inexpensive to manufacture, yet effective in operation.

SUMMARY OF THE INVENTION

The present invention is a novel circuit combining negative slope equalization with low pass filtering and low frequency compensation. The circuit is used with first and second electrical lines for transmitting electrical signals in the voice frequency range. The circuit or universal equalization network comprises a means for inputting and filtering the electrical signal from the first electrical line, means for then reverse equalizing the electrical signal, first and second means for equalizing the signal, means for low pass filtering the signal followed by a means for supplemental equalization, and finally, means for outputting the signal to the second electrical line.

BRIEF DESCRIPTION OF THE DRAWINGS

The features of the present invention which are believed to be novel, are set forth with particularity in the appended claims. The invention together with further objects and advantages thereof may best be understood by reference to the following description, taken in conjunction with the accompanying drawings in the several figures in which like reference numerals identify like elements, and in which:

DESCRIPTION OF THE PREFERRED EMBODIMENT

Figure 1:
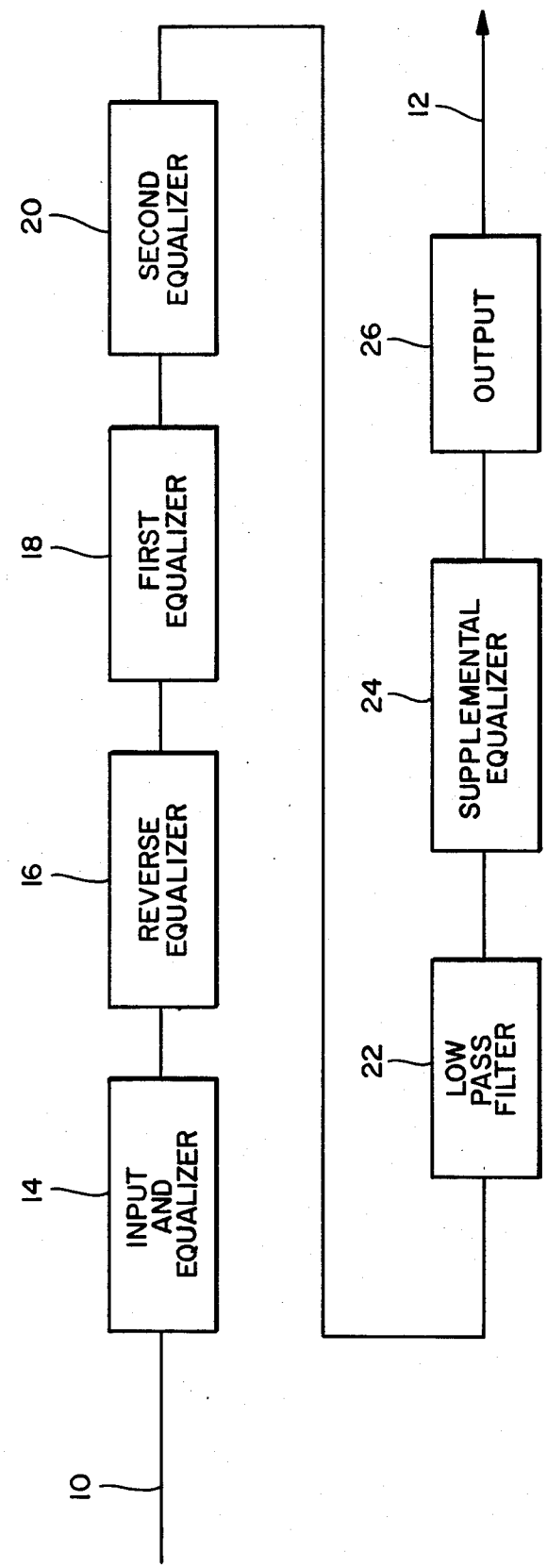
FIG. 1 is a block diagram of the novel universal equalizer network.
Figure 2A:
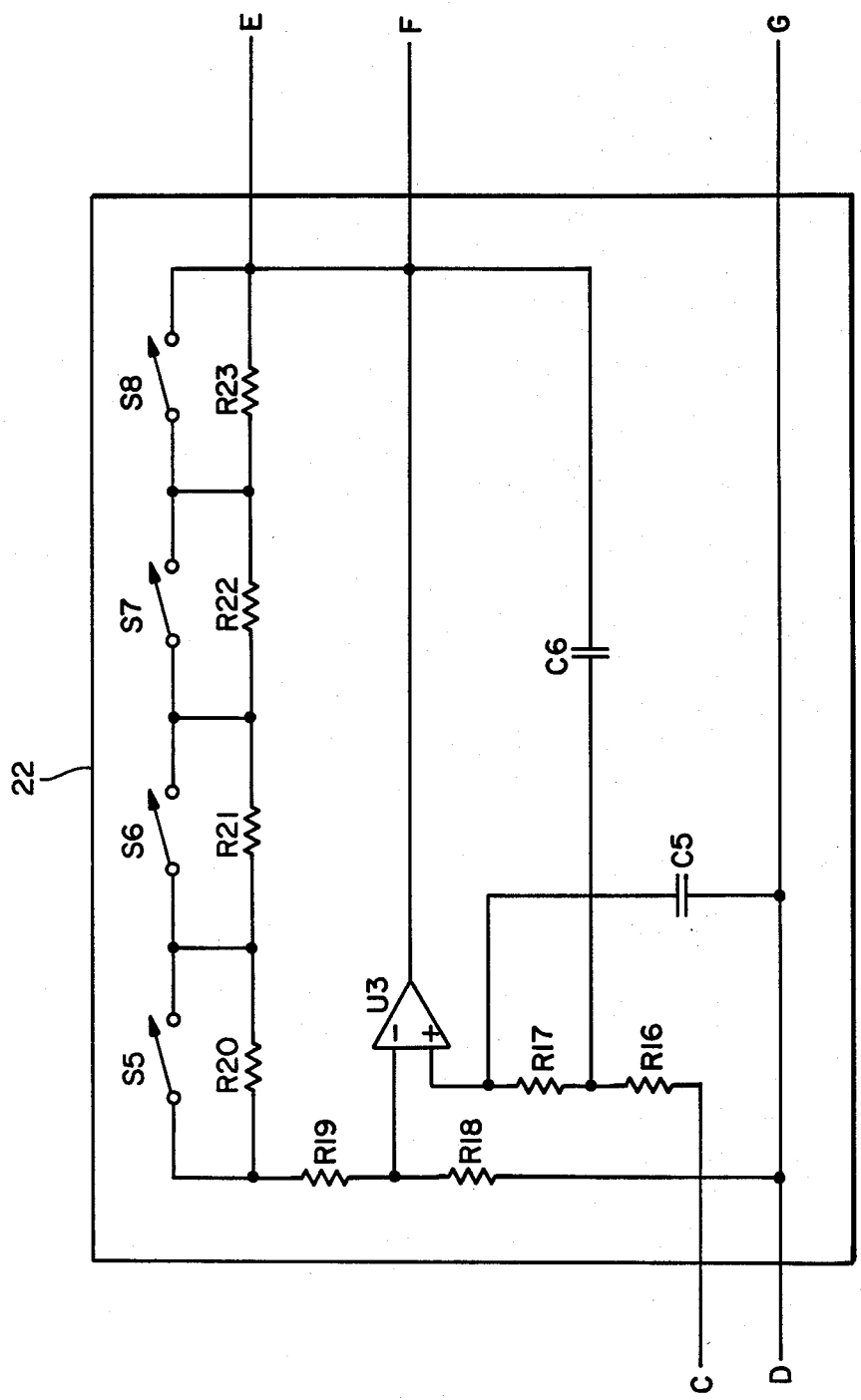
FIGS. 2a to 2d together are a schematic circuit diagram of the network.
Figure 2B:
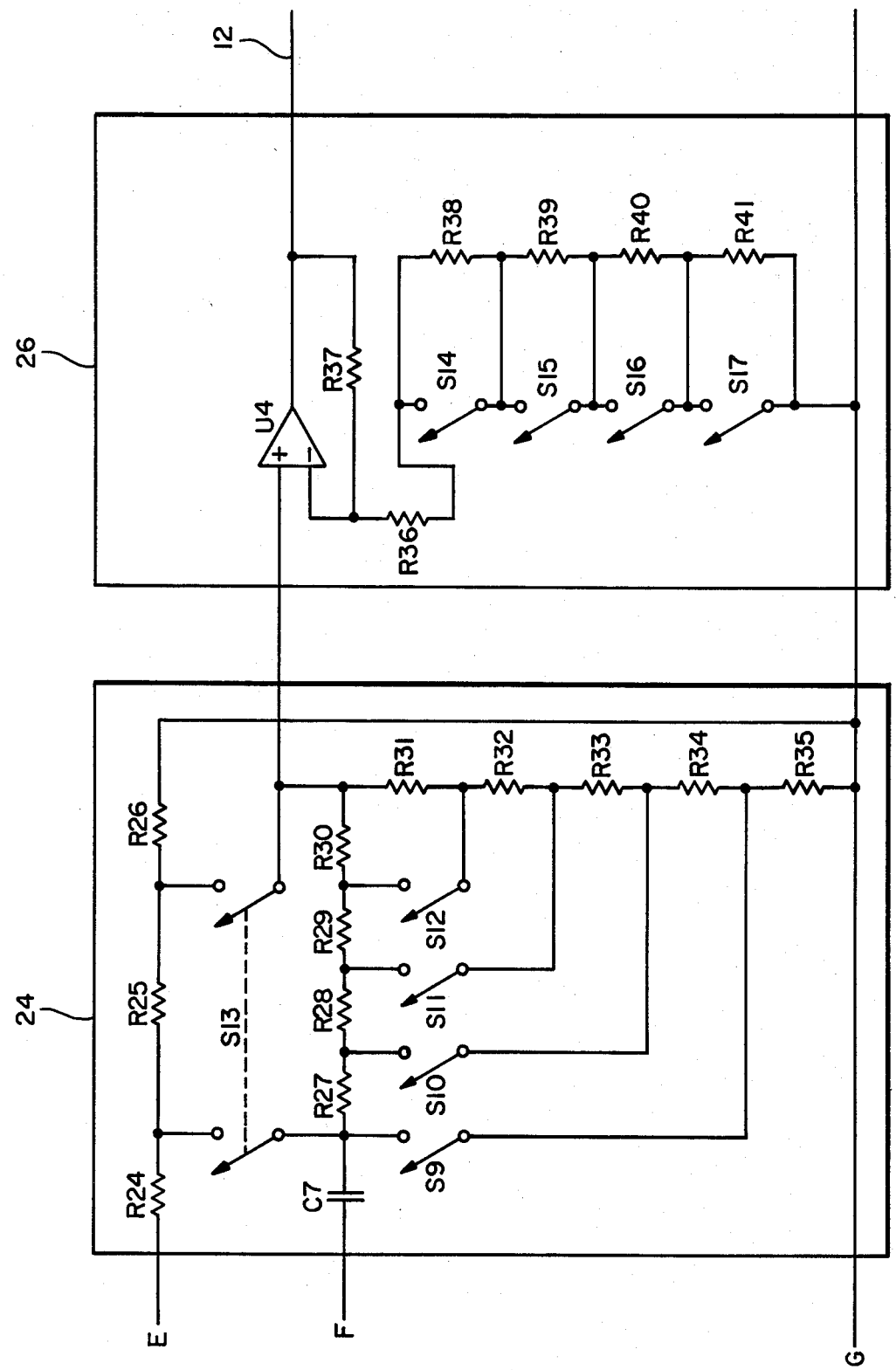
Figure 2C:
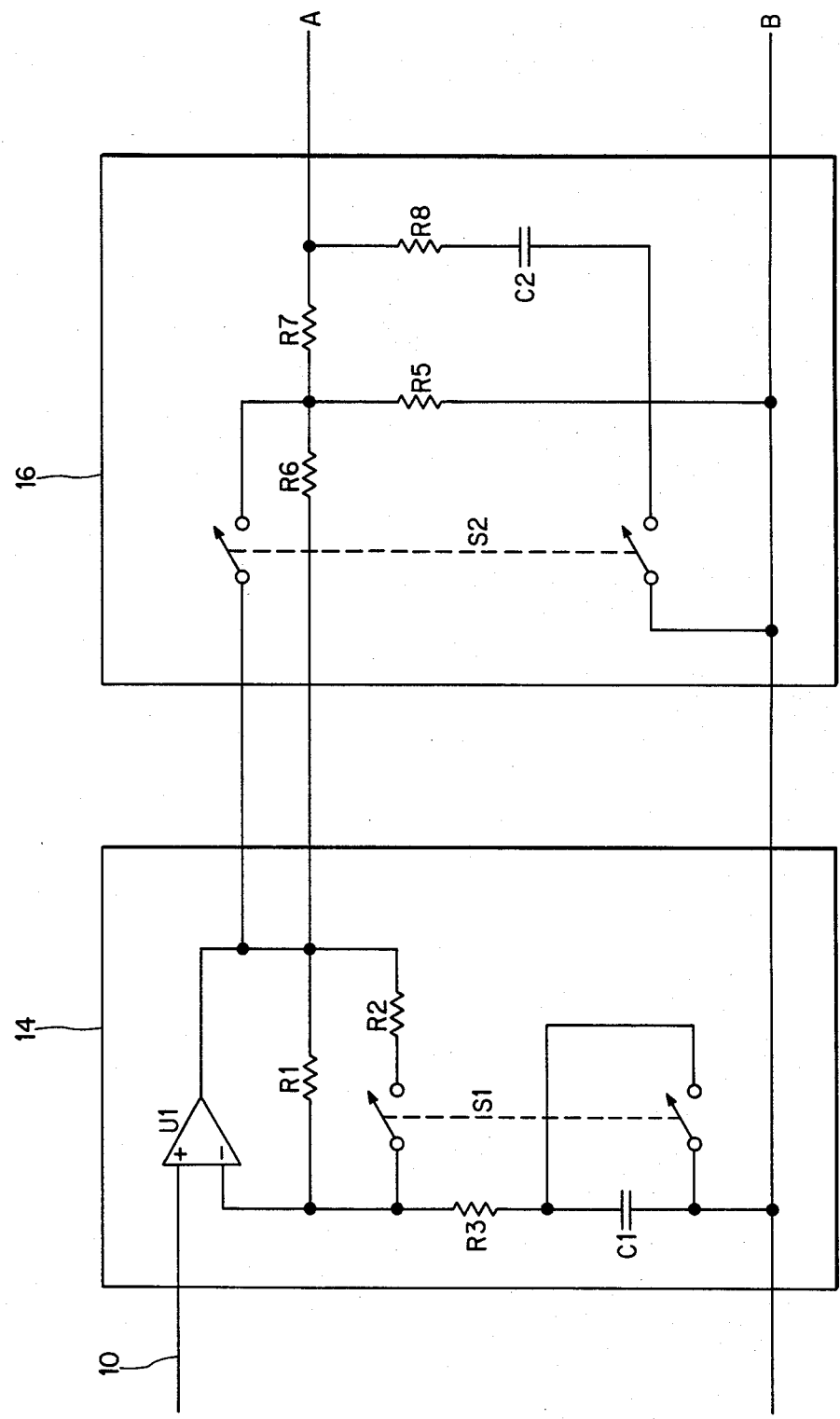
Figure 2D:
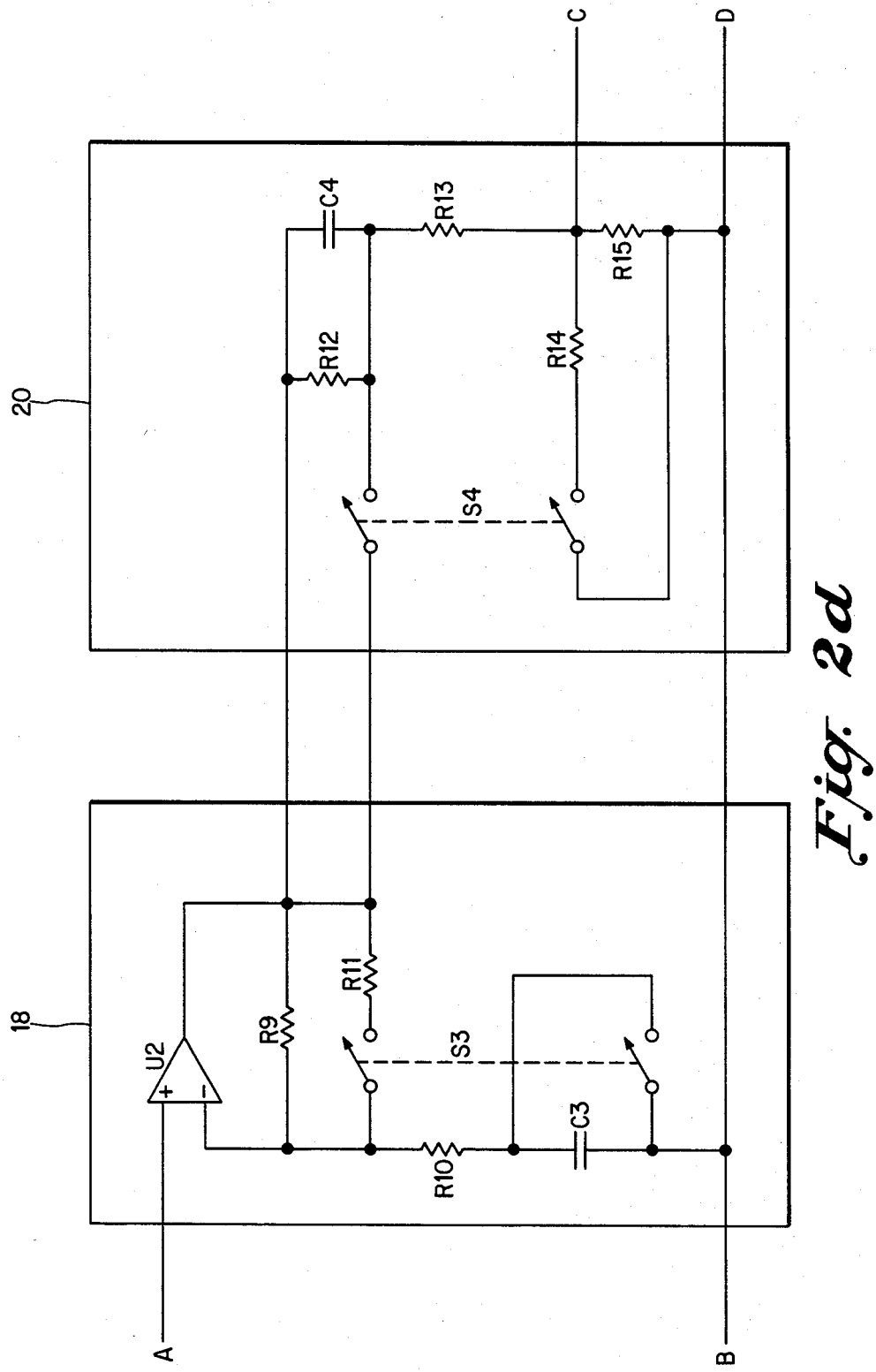

This invention relates to a novel electronic circuit for a universal equalization network having a reverse equalizer circuit. A block diagram of the universal equalization network is illustrated in FIG. 1 and is for use with first and second electrical lines 10 and 12 for carrying an electrical signal in the voice frequency range.

The network comprises a means 14 for inputting and equalizing the electrical signal from the first electrical line 10, a means 16 for reverse equalizing the electrical signal, the first means 18 for equalizing, a second means 20 for equalizing, a means 22 for low pass filtering and equalizing, a means 24 for supplemental equalizing, and a means 26 for outputting the signal to the second electrical line 12.

Figure 3:
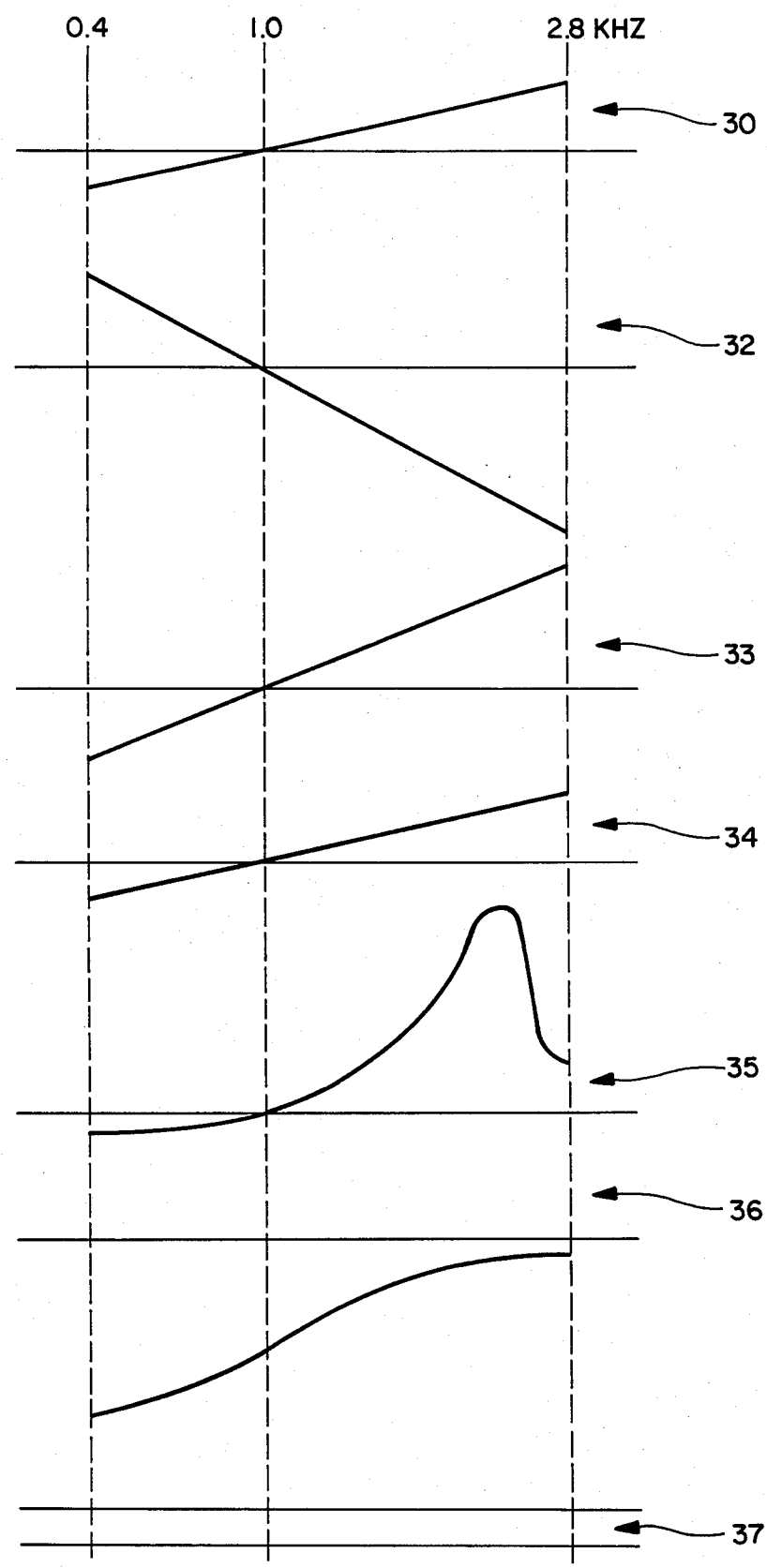
FIG. 3 illustrates the frequency response curves for each section of the network.

The means 16 for reverse equalizing, the means 22 for low pass filtering and equalizing, and the means 24 for supplemental equalizing form a reverse equalization network. The means 16 for reverse equalizing is a single-pole, single-zero filter forming a four decibel negative slope as illustrated in graph 32 in FIG. 3. The means 22 for low pass filtering and equalizing is a second order low pass filter with adjustable Q providing an adjustable damping factor for adjusting the degree of overdamping or underdamping and has a frequency response for one of its settings as illustrated in graph 35 in FIG. 3. The means 24 for supplemental equalization, which includes a low frequency equalizer, has a frequency response illustrated in graph 36 and shapes the overall frequency response to create a positive four decibel slope equalizer when cascaded with a means 22 for low pass filtering and shapes the frequency response to be flat when other circuit parameters are properly adjusted.

The means 14 for inputting and equalizing has a positive one decibel slope (graph 30) the first and second means, 18 and 20, for equalizing have positive four decibel and positive two decibel slopes respectively, (graphs 33 and 34, respectively), and the means 26 for outputting has an adjustable gain (graph 37).

The first means 18 for equalizing, the second means 20 for equalizing, and the means 14 for inputting and equalizing are single-pole, single-zero filters. The pole of the first means 18 for equalizing is at the same frequency as the zero of the means 16 for reverse equalizing, and the zero of the first means 18 for equalizing is at the same frequency as the pole of the means 16 for reverse equalizing.

The universal equalization network can be adjusted to operate with "loaded" and "non-loaded" lines and combinations thereof and two-wire and four-wire lines. This is achieved by either using all sections of the network or by disabling sections of the network such that they have substantially no effect upon the frequency response. Means for disabling equalizing are provided for the means 14 for inputting and equalizing, the means 16 for reverse equalizing, and the first and second means 18 and 20 for equalizing.

A detailed schematic of the universal equalization network is shown in FIGS. 2a to 2d. The first electrical line 10 is connected to operational amplifier U1. U1, R1, R3, and C1 form a single-pole, single-zero filter delivering 1 db gain at 2.8 KHz (reference 1 KHz) if switch S1 is in the open position. Resistor R2 holds the gain at 1 KHz unchanged if S1 is switched to the closed position (flat response). The switches S2, S3 and S4 slope equalizer switches are shown in the position for slope equalization with the open switch S2 removing reverse equalization from the network.

The reverse equalization network comprising the means 16 for reverse equalizing, the means 22 for low-pass filtering, and the means 24 for supplemental equalizing provides a novel solution to the problem of the various frequency responses associated with two-wire and four-wire terminations, whether loaded or unloaded. The present invention further solves the problem of increase of gain in higher frequencies out of the normal frequency band. These higher frequencies can cause a singing phenomenom if undamped. The present invention utilizes the above described combination to produce an undamped filter (Graph 36) which swings up with the bump shown in graph 35, and is compensated by using a reverse equalizer (Graph 32) which has a reverse slope or overdamped filter slope. This results in a flat frequency response for loaded lines, and a reverse slope, and underdamped filter when there is no need for equalization. When equalization is needed, the reverse equalizer 16 is removed.

Resistors R6, R7, R8 and capacitor C2 are a single-pole, single-zero filter forming a negative slope equalizer, having a 4 db attenuation at 2.8 KHz. Resistor R5 holds the gain at 1 KHz unchanged when S2 is in the open position. Operational amplifier U2 and R9, R10 and C3 form a positive slope equalizer of 4 db. When switch S3 is closed, resistor 11 holds the gain at 1 KHz unchanged. When switch 34 is in the open position, resistors R12, R13, R14, and R15, and capacitor C4 form a 2 db slope equalizer.

The operational amplifier U3, capacitors C5 and C6 and resistors R16 through R23 implement a second order low pass filter and equalizer known as an equal component Sallen-Key filter. The filter has adjustable damping which does not affect the frequency response except at the high end of the frequency range. Switches S5, S6, S7, and S8 are used to adjust the damping. The resistors R24 to R35, the capacitor C7 and switches S9 to S13 comprise the supplementary equalizer and low frequency equalizer. Switch S13 is opened for "loaded" condition and closed for "non-loaded" condition. Switches S9 to S12 affect the low frequency response in the "loaded" condition and should remain open in the "non-loaded" condition.

The table below discloses the switches settings for the corresponding slope equalization desired. Each setting is defined as the ratio of the output level at 2800 Hz and 1000 Hz, expressed in db.

TABLE 0 db—S1, S2, S3, S4 closed
1 db—S1 opened
2 db—S4 opened
3 dB—S1, S4 opened
4 dB—S2 opened or S3 opened
5 dB—S2, S1 opened or S3, S1 opened
6 dB—S2, S4 opened or S3, S4 opened
7 dB—S2, S1 S4 opened or S3, S1, S4 opened
8 dB—S2, S3 opened
9 db—S2, S3, S1 opened
10 db—S2, S3, S4 opened
11 db—S2, S3, S4, S1 opened
Note: For all db settings, S13 is closed and S9, S10, S11, and S12 are opened.

A 1 KHz gain equalizer and buffer is formed by operational amplifier U4 with resistors R36 through R41 and switches S14 to S17. The circuit compensates for small changes in the 1 KHz level caused by underdamping or overdamping adjustment of low pass filter 22. Switches S5, S6, S7 and S8 are ganged as pairs with switches S14, S15, S16, and S17 respectively, with switch pairs being either opened or closed. For example, switches S5 and S14 are both either opened or closed.

This invention is not limited to the particular details of the apparatus depicted and other modifications and amplifications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What I claim is:

1. A reverse equalization network for use with an equalizer circuit having an input means, at least one equalizer means and an output means said reverse equalization network comprising:
   means for reverse equalizing connected between the input means and the equalizer means;
   means for low pass filtering connected to the equalizer means; and
   means for supplemental equalizing connected between said means for low pass filtering and the output means.

2. The network described in claim 1 wherein said means for reverse equalizing is a single-pole, single-zero filter forming a four decibel negative slope.

3. Network described in claim 1 wherein said means for low pass filtering is a second order low pass filter.

4. The network described in claim 3 wherein said second order low pass filter also includes an adjustable damping which does not significantly affect the frequency response except at the high end of the frequency range.

5. The network described in claim 1 wherein said means for supplemental equalizing shapes the frequency response to create a positive four decibel slope equalizer when cascaded with said means for low pass filtering and shapes the frequency response for being flat.

6. The network described in claim 1 wherein said means for reverse equalizing includes means for disabling said means for reverse equalizing such that the frequency response is substantially unaffected.

7. The network described in claim 1 wherein said means for low pass filtering is adjustable for a degree of overdamping or underdamping.

8. The network described in claim 1 wherein said means for supplemental equalizing is adjustable.

9. A universal equalization network for use with first and second electrical lines for carrying an electrical signal, said network comprising:
   means for inputting and equalizing the electrical signal from the first electrical line, said means for inputting and equalizing connected to the first electrical line;
   means for reverse equalizing the electrical signal connected to said means for inputting and equalizing;
   first means for equalizing the electrical signal connected to said means for reverse equalizing,
   second means for equalizing the signal connected to said first means for equalizing;
   means for low pass filtering of the signal connected to said second means for equalizing;
   means for supplemental equalizing the signal connected to said means for low pass filtering; and
   means for outputting the signal to the second electrical line connected to the said means for supplemental equalizing.

10. The circuit described in claim 9 wherein said means for reverse equalizing is a single-pole, single-zero filter forming a four decibel negative slope.

11. The circuit described in claim 9 wherein said first means for equalizing comprises a positive four decibel slope equalizer using a single-pole, single-zero filter.

12. The network described in claim 9 wherein said means for reverse equalizing is a filter having a single pole and a single zero and forming a 4 db slope, wherein said first means for equalizing is a filter having a single pole and a single zero forming a 4 db positive slope, said pole of said means for reverse equalizing located at the same frequency as the zero of said first means for equalizing and said zero of said means for reverse equalizing located at the same frequency as the pole of said first means for equalizing such that the frequency response is substantially unaffected.

13. The circuit described in claim 9 wherein said second means for equalizing comprises a positive two decibel slope equalizer using a single-pole, single-zero filter.

14. The circuit described in claim 9 wherein said means for low pass filtering is a second order low pass filter.

15. The network described in claim 9 wherein said means for supplemental equalizing shapes the frequency response to create a positive 4 db slope equalizer when cascaded with means for low-pass filtering.

16. The network described in claim 9 wherein said means of inputting and equalizing includes means or disabling equalizing of said means for inputting and equalizing such that the frequency response is substantially unaffected.

17. The network described in claim 9 wherein said means for reverse equalizing includes means for disabling said means for reverse equalizing such that the frequency response is substantially unaffected.

18. The network described in claim 9 wherein said first means for equalizing includes means for disabling said first means for equalizing such that the frequency response is unaffected.

19. The network described in claim 9 wherein said second means for equalizing includes means for disabling said second means for equalizing such that the frequency response is unaffected.

20. The network described in claim 9 wherein said means for low pass filtering provides equalization and is adjustable for a degree of overdamping or underdamping.

21. The network described in claim 4 wherein said means for supplemental filtering is adjustable.

22. The network described in claim 9 wherein said means for outputting has an adjustable gain.

* * * * *